United States Patent
Charrier et al.

(10) Patent No.: US 10,497,932 B2
(45) Date of Patent: Dec. 3, 2019

(54) LITHIUM ACCUMULATOR COMPRISING A POSITIVE ELECTRODE MATERIAL BASED ON A SPECIFIC CARBON MATERIAL FUNCTIONALIZED BY SPECIFIC ORGANIC COMPOUNDS

(71) Applicant: COMMISSARIAT À L'ÉNERGIE ATOMIQUE ET AUX ÉNERGIES ALTERNATIVES, Paris (FR)

(72) Inventors: Gaëlle Charrier, Versailles (FR); Stéphane Campidelli, Saint Remy L'Honore (FR); Céline Barchasz, Fontaine (FR); Bruno Jousselme, Massy (FR); Renaud Cornut, Chatillon (FR)

(73) Assignee: COMMISSARIAT À L'ÉNERGIE ATOMIQUE ET AUX ÉNERGIES ALTERNATIVES, Paris (FR)

( * ) Notice: Subject to any disclaimer, the term of this patent is extended or adjusted under 35 U.S.C. 154(b) by 1014 days.

(21) Appl. No.: 14/820,613

(22) Filed: Aug. 7, 2015

(65) Prior Publication Data
US 2016/0043386 A1 Feb. 11, 2016

(30) Foreign Application Priority Data
Aug. 8, 2014 (FR) ..................... 14 57713

(51) Int. Cl.
*H01M 4/137* (2010.01)
*H01M 4/587* (2010.01)
(Continued)

(52) U.S. Cl.
CPC .......... *H01M 4/137* (2013.01); *H01M 4/133* (2013.01); *H01M 4/587* (2013.01); *H01M 4/606* (2013.01);
(Continued)

(58) Field of Classification Search
CPC .......... H01M 10/052; H01M 10/0525; H01M 2004/028; H01M 4/133; H01M 4/137;
(Continued)

(56) References Cited

U.S. PATENT DOCUMENTS 9,166,255 B2   10/2015   Barchasz et al.
9,331,359 B2    5/2016   Barchasz et al.
(Continued)

OTHER PUBLICATIONS

Le Barny, P., et al., "Covalently functionalized single-walled carbon nanotubes and graphene composite electrodes for pseudocapacitor application.", "Proceedings of SPIE", Sep. 24, 2013, pp. 88140I-1-88140I-10, vol. 8814.
(Continued)

*Primary Examiner* — Lingwen R Zeng
(74) *Attorney, Agent, or Firm* — Pearne & Gordon LLP

(57) ABSTRACT

The invention relates to a lithium accumulator comprising at least one electrochemical cell comprising an electrolyte positioned between a positive electrode and a negative electrode, said positive electrode comprising a positive electrode material comprising a carbonaceous material selected from carbon nanotubes, graphene or derivatives of graphene selected from graphene oxides, reduced graphene oxides, said carbonaceous material is covalently functionalized by at least one organic compound comprising at least one electron attractor group.

23 Claims, 6 Drawing Sheets

(51) Int. Cl.
  *H01M 4/60* (2006.01)
  *H01M 4/133* (2010.01)
  *H01M 10/0525* (2010.01)
  *H01M 4/02* (2006.01)

(52) U.S. Cl.
  CPC ........ *H01M 4/608* (2013.01); *H01M 10/0525* (2013.01); *H01M 2004/028* (2013.01)

(58) Field of Classification Search
  CPC ........ H01M 4/362; H01M 4/587; H01M 4/60; H01M 4/606; H01M 4/608; H01M 4/625; Y02E 60/122
  See application file for complete search history.

(56) References Cited

U.S. PATENT DOCUMENTS

| | | | |
|---|---|---|---|
| 9,337,508 B2 | 5/2016 | Barchasz et al. | |
| 9,597,677 B2 | 3/2017 | Campidelli et al. | |
| 2014/0044884 A1 | 2/2014 | Berthelot et al. | |
| 2014/0363746 A1* | 12/2014 | He | H01M 10/052 429/406 |

OTHER PUBLICATIONS

Huang, W., et al., "Quasi-Solid-State Rechargeable Lithium-Ion Batteries with a Calix[4]quinone Cathode and Gel Polymer Electrolyte", "Angew. Chem. Int. Ed.", 2013, pp. 9162-9166, vol. 52.

Ji, X., et al., "A highly ordered nanostructured carbon-sulphur cathode for lithium-sulphur batteries", "Nature Materials", Jun. 2009, pp. 500-506, vol. 8 (online May 17, 2009).

Leitner, K. W., et al., "Combination of redox capacity and double layer capacitance in composite electrodes through immobilization of an organic redox couple on carbon black", "Electrochimica Acta", 2004, pp. 199-204, vol. 50, No. 1.

Pirnat, K., et al., "Electrochemically stabilised quinone based electrode composites for Li-ion batteries", "Journal of Power Sources", 2012, pp. 308-314, vol. 199 (online Oct. 20, 2011).

Pognon, G., et al., "Performance and stability of electrochemical capacitor based on anthraquinone modified activated carbon", "Journal of Power Sources", 2011, pp. 4117-4122, vol. 196 (online Nov. 26, 2010).

Wildgoose, G., et al., "Chemically Modified Carbon Nanotubes for Use in Electroanalysis", "Microchim Acta", Nov. 30, 2005, pp. 187-214, vol. 152.

* cited by examiner

LITHIUM ACCUMULATOR COMPRISING A POSITIVE ELECTRODE MATERIAL BASED ON A SPECIFIC CARBON MATERIAL FUNCTIONALIZED BY SPECIFIC ORGANIC COMPOUNDS

TECHNICAL FIELD

The present invention relates to novel lithium accumulators as well as to positive electrode materials, and more particularly to positive electrode materials based on a specifically functionalized carbonaceous material, with view to being able to be used in positive electrodes of lithium accumulators.

The field of the invention may thus be defined as that of energy storage devices, in particular that of electrochemical lithium accumulators.

STATE OF THE PRIOR ART

Energy storage devices are conventionally electrochemical accumulators operating on the principle of electrochemical cells capable of delivering an electric current by the presence in each of them of a pair of electrodes (a positive electrode and a negative electrode, respectively) separated by an electrolyte, the electrodes comprising specific materials capable of reacting according to an oxidation-reduction reaction, in return for which electrons are produced at the origin of the electric current and ions are produced which will circulate from one electrode to the other via an electrolyte.

Presently the most used accumulators subscribing to this principle are the following:

*Ni-MH accumulators using metal hydride and nickel oxyhydroxide as electrode materials;

*Ni-Cd accumulators using cadmium and nickel oxyhydroxide as electrode materials;

*lead-acid accumulators using lead and lead oxide $PbO_2$ as electrode materials; and

*lithium accumulators, such as lithium-ion accumulators, completely or partly conventionally using lithiated materials as active electrode materials, which form insertion/de-insertion materials for lithium, depending on whether the accumulator is in a charging or discharging process.

Because lithium is a particularly light weight solid element and has the most reducing electrochemical potential, thus allowing access to a mass energy density of interest, lithium accumulators have widely taken over the other mentioned accumulators above because of the continuous improvement of the performances of lithium-ion accumulators in terms of energy density. Indeed, lithium-ion accumulators give the possibility of obtaining mass and volume energy densities (which may be greater than 180 $Wh.kg^{-1}$) clearly greater than that of Ni-MH and Ni—Cd accumulators (which may range from 50 to 100 $Wh.kg^{-1}$) and lead-acid accumulators (which may range from 30 to 35 $Wh.kg^{-1}$). Furthermore, Li-ion accumulators may have a rated cell voltage above that of the other accumulators (for example, a rated voltage of the order of 3.6 V for one cell applying, as electrode materials, the $LiCoO_2$/graphite pair against a rated voltage of the order of 1.5 V for the other aforementioned accumulators).

Because of their intrinsic properties, lithium-ion accumulators therefore prove to be of particular interest for fields where self-containment is a primordial criterion, as this is the case in fields of computer science, video, telephone industry, transports such as electric vehicles, hybrid vehicles or further medical, space, microelectronics fields. However, the technology of lithium-ion accumulators today experiences capping of its performances.

Presently, a novel accumulator technology based on lithium emerges as a promising alternative, this technology being the lithium/sulfur technology, wherein the positive electrode comprises as an active material elementary sulfur or a derivative of sulfur, such as lithium sulfide or poly (lithium sulfide).

The use of sulfur, as an active material of a positive electrode, is particularly attractive, since sulfur has a very high theoretical specific capacity which may be up to 10 times more than that obtained for conventional positive electrode materials (of the order of 1,675 mAh/g instead of 140 mAh/g for $LiCoO_2$). Furthermore, sulfur is abundantly present on the planet and consequently is characterized by low costs. Finally, it is not very toxic. All these properties contribute to making it particularly attractive with view to placing it at a large scale, notably for electric vehicles, this all the more since lithium/sulfur accumulators may give the possibility of attaining mass energy densities which may range from 300 to 600 $Wh.g^{-1}$ versus 200-250 $Wh.g^{-1}$ at the most expected for lithium-ion accumulators.

From a functional point of view, this type of accumulator has an original discharge mechanism without any reactions for insertion/de-insertion of lithium ions like for lithium-ion accumulators. The reaction at the origin of current production (i.e. when the accumulator is in the discharge mode) sets into play an oxidation reaction of lithium at the negative electrode which produces electrons, which will feed the outer circuit to which are connected the positive and negative electrodes, and a reaction for reducing sulfur at the positive electrode.

Thus, explicitly, in the discharge process, the overall reaction is the following:

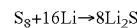

$$S_8 + 16Li \rightarrow 8Li_2S$$

which is the sum of the reaction for reducing sulfur at the positive electrode ($S_8 + 16e^- \rightarrow 8S^{2-}$) and of the oxidation reaction of lithium at the negative electrode ($Li \rightarrow Li^+ + e^-$).

It is understood that the reverse electrochemical reactions occur during the charging process.

As it is apparent from the equation above, the reaction involves an exchange of 16 electrons, which justifies the high specific capacity of sulfur (1,675 $mAh.g^{-1}$).

From a mechanistic point of view, and without being bound to theory, in the initial state (i.e. when the battery is fully charged), the active material which is elementary sulfur, is present in the solid state in the positive electrode. During reduction of the sulfur, i.e. during the discharging process, the cyclic sulfur molecules are reduced and form linear chains of poly(lithium sulfide), of general formula $Li_2S_n$, with n being able to range from 2 to 8. Since the starting molecule is $S_8$, the first compounds formed are poly(lithium sulfide)s with long chains, such as $Li_2S_8$ or $Li_2S_6$. As these poly(lithium sulfides) are soluble in organic electrolytes, the first discharging step therefore consists in solubilizing the active material in the electrolyte, and the production of poly(lithium sulfides) with long chains in solution. And then, gradually as reduction of the sulfur is continued, the chain length of the polysulfides is gradually reduced, and compounds such as $Li_2S_5$, $Li_2S_4$ or further $Li_2S_2$ are formed in solution. Finally, the final reduction product is lithium sulfide ($Li_2S$) which, itself is insoluble in organic electrolytes.

The lithium/sulfur technology has several drawbacks, which justifies the reason for which it is not yet the subject of marketing at the present time.

On the one hand, the elementary sulfur used as an active positive electrode material is an electronic insulator and therefore accordingly cannot be used alone for forming the positive electrode but only in association with an electricity-conducting material, such as a carbonaceous material like carbon black.

On the other hand, as already mentioned above, during the cycling, there is dissolution of the active material into the electrolyte, and more specifically, formation of poly(lithium sulfide)s during the first steps for reducing soluble $S_8$ into the organic electrolytes. These poly(lithium sulfide)s may cause an increase in the viscosity of the electrolyte and therefore a reduction in the ion mobility, and may also diffuse through the electrolyte, and corrode the negative electrode and generate a self-discharging phenomenon of the accumulator.

Finally, the presence of dissolved polysulfides in the electrolyte causes the occurrence of a redox shuttle mechanism as well as a significant drop of Coulombic efficiency.

In order to overcome these drawbacks, studies were dedicated to evaporating novel positive electrode materials for accumulators of the lithium/sulfur type, for example by encapsulation/impregnation of the sulfur-containing material in a matrix, as this is described, notably in Nat.Mat. 8 (2009), 500-506, wherein the matrix is a mesoporous carbon lattice impregnated with sulfur, the purpose being of avoiding dissolution of the elementary sulfur and of the poly(lithium sulfide)s in the electrolyte. However, these materials remained with relative efficiency.

In addition to the lithium/sulfur technology, there also exists another accumulator technology based on lithium, also-called lithium-organic technology, wherein the positive electrode comprises, as an active material, organic molecules comprising at least one electron attractor group, i.e. a group capable of capturing electrons during the discharge of the accumulator, such as carbonyl groups like, more specifically, quinone groups.

However, like in the case of the lithium/sulfur accumulators described above, the major drawback of these systems lies in the solubility of the electron attractor organic molecules in the conventionally used liquid electrolytes, which causes significant losses of capacity after a relatively limited number of cycles. In order to circumvent this drawback, certain investigations, like those described in Angew. Chem. Int. Ed. 2013, 52, 9162-9166, have intended to replace the liquid electrolytes with electrolytes appearing as a polymeric gel, with the idea of limiting the diffusion of the active material towards the negative electrode. However, this does not allow suppression of the phenomenon of dissolution of electron attractor organic molecules but just postponing it in time.

Thus, at the present time, whether this is for the lithium/sulfur accumulators or for the lithium-organic accumulators, no satisfactory answer was brought to the problem of dissolution into the electrolyte of the active materials comprised in the positive electrode.

In this context, the inventors thus set as a goal, the development of novel lithium accumulators based on active positive electrode materials, which are unable to be dissolved in electrolytes during the discharging of the accumulator.

DISCUSSION OF THE INVENTION

Thus, the invention relates to a lithium accumulator comprising at least one electrochemical cell comprising an electrolyte positioned between a positive electrode and a negative electrode, said positive electrode comprising a positive electrode material comprising a carbonaceous material selected from carbon nanotubes, graphene or derivatives of graphene selected from graphene oxides, reduced graphene oxides, said carbonaceous material is covalently functionalized with at least one organic compound comprising at least one electron attractor group.

Without going into more details in the discussion of this invention, we specify the following definitions.

By positive electrode, is conventionally meant in the foregoing and in the following, the electrode which acts as a cathode, when the generator outputs current (i.e. when it is in a discharging process) and which acts as an anode when the generator is in a charging process.

By negative electrode, is conventionally meant, in the foregoing and in the following, the electrode which acts as an anode, when the generator outputs current (i.e. when it is in a discharging process) and which acts as a cathode, when the generator is in a charging process.

It is specified that, by «covalently functionalized» is meant, in the sense of the invention, immobilization of the organic compound(s) comprising at least one electron attractor group on the carbonaceous material (carbon nanotubes and graphene) via a covalent chemical bond.

It is specified that, by an electron attractor group is meant a group capable of attracting electrons and specifically, in our scenario, capable of attracting during a reduction reaction for forming a reduced group, and more specifically during a reduction reaction occurring at the positive electrode, when the lithium accumulator is in a discharging process. The compound(s) bearing at least such a group thus form(s) the active material of the positive electrode, i.e. the material engaged into the charging and discharging reactions of the accumulator.

The positive electrode materials used in the lithium accumulators of the invention do not have the drawbacks of those of the prior art, notably as regards the solubilization of the materials in the electrolytes, since the organic compound(s) comprising at least one electron attractor group is (are) immobilized by covalence on the carbonaceous material, which itself is not soluble. Accordingly, the electrode materials remain confined within the positive electrode.

According to the invention, the organic compound comprising at least one electron attractor group may be a compound comprising one or several cyclic groups, for example one or several aryl groups, for which at least one of these groups bears at least one electron attractor group.

According to the invention, the electron attractor group may advantageously be selected from carbonyl groups, disulfide groups, thiocarbonyl groups.

When these are carbonyl groups, the latter preferably conjugate with a double bond.

Compounds comprising a carbonyl group, as an electron attractor group and more specifically, comprising a carbonyl group, as an electron attractor group, conjugate with a double bond, are advantageously quinone compounds, i.e. compounds which are derived from aromatic compounds (such as benzene, naphthalene and anthracene) by conversion of an even number of —CH= groups into —C(=O)— with suitable re-arrangement of the double bonds, which leads to a conjugate cyclic dione structure.

As examples, mention may be made of:

benzoquinone compounds, such as those of the following formulae (I) and (II):

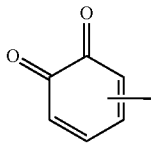
(I)

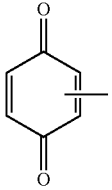
(II)

naphthoquinone compounds, such as that of the following formula (III):

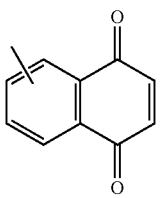
(III)

anthraquinone compounds, such as that of the following formula (IV):

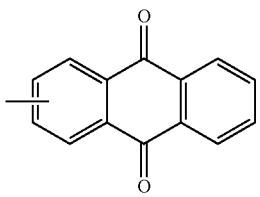
(IV)

phenanthrenequinone compounds, such as the one of the following formula (V):

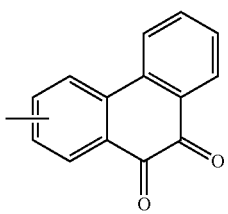
(V)

the bonds located in the middle of the carbon-carbon bonds indicating that the attachment to the carbonaceous material of the relevant compound is ensured by one of the carbon atoms making up the benzene ring(s).

More specifically and as an example, a compound covalently functionalizing a carbonaceous material fits the following formula (VI):

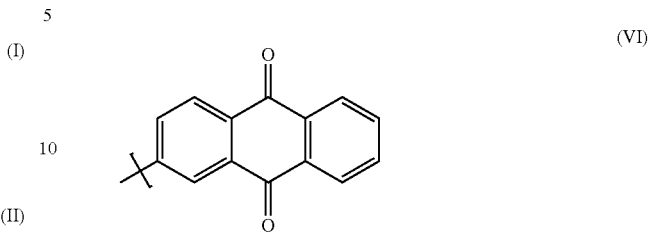
(VI)

the bond intercepted with a brace indicating that the attachment of the relevant compound by covalence to the carbonaceous material is carried out via this bond.

When such an electrode material is incorporated into a lithium accumulator in order to form the positive electrode and that the negative electrode is in lithium, the reactions at the electrodes may be schematized by the following equations:

$$Li \longrightarrow Li^+ + e^-$$

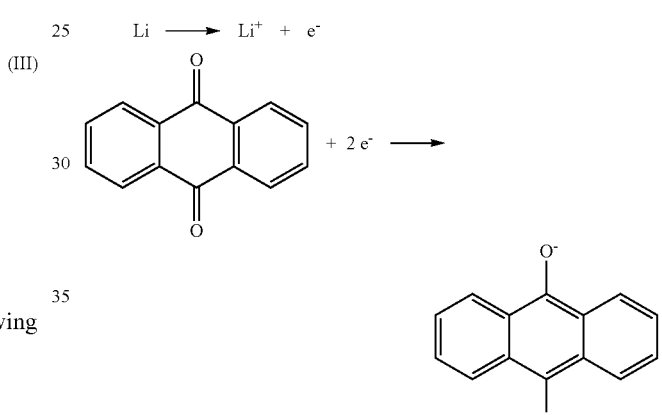

Compounds comprising, as an electron attractor group, a carbonyl group, may also be compounds of the «polymer» type comprising at least one recurrent unit, said recurrent unit comprises one or several rings, for which one of these rings is a ring comprising at least one carbonyl group.

More specifically, such compounds may comprise at least one recurrent unit from the family of quinones, such as anthraquinones.

As an example, mention may be made as a compound meeting this specificity, a compound comprising, as a recurrent unit, a recurrent unit of the following formula (VI'):

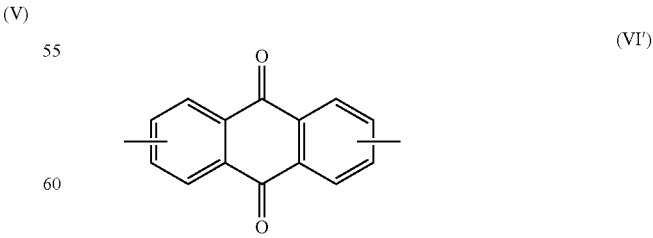
(VI')

the two bonds intercepting the carbon-carbon bonds indicating that the latter are bound to one of the carbon atoms of the benzene ring, of which they intercept the carbon-carbon bond, the polymer resulting from the repetition of said recurrent unit may be bound to the carbonaceous material via an organic group forming a bridge between the relevant recurrent unit and the carbonaceous material, such an organic group forming a bridge may fit the following formula:

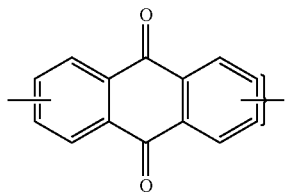

the bond intercepted by a brace indicating that the group is bound to the wall of the carbon nanotubes through a carbon atom of the benzene ring, the other bond intercepting the benzene ring indicating that the group is bound to another recurrent unit.

Suitable compounds for the invention comprising, as an electron attractor group, a disulfide group may also be cyclic compounds including one or several rings, in which at least one ring includes a disulfide group.

Compounds meeting this specificity may be cyclic compounds comprising at least one aromatic ring placed beside at least one ring comprising a disulfide group.

Such compounds may fit one of the following formulae (VII) to (X):

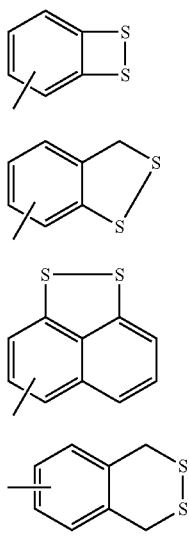

the bond intercepting the carbon-carbon bond indicating that the bond between the benzene ring(s) and the carbonaceous material is ensured by one of the carbon atoms of this or these ring(s); these compounds respectively having the following standard potentials calculated with the counter-ion Li$^+$ in acetonitrile (vs Li$^+$/Li): 2.78; 1.88; 1.82 and 1.73.

Compounds fitting this specificity may also be compounds of the "polymer" type comprising at least one recurrent unit, said recurrent unit comprises one or several rings, for which one of these rings is a ring comprising a disulfide group.

More specifically, such compounds may comprise at least one recurrent unit fitting one of the following formulae (XI) to (XV):

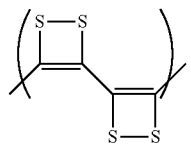

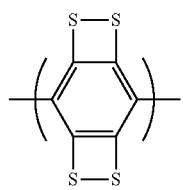

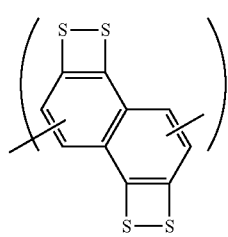

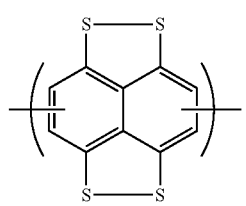

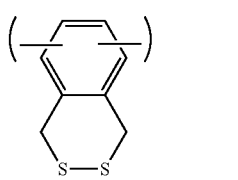

said recurrent units may be bound to the carbonaceous material via an organic group forming a bridge between the relevant recurrent unit and the carbonaceous material, both bonds intercepting the carbon-carbon bonds for formulae (XIII) to (XV) indicating that the latter are bound to one of the carbon atoms of the benzene ring, the carbon-carbon bond of which is intercepted by them.

As an example, when the recurrent unit is a recurrent unit of the aforementioned formula (XV), the compound comprising such a recurrent unit may be bound to the carbonaceous material through an organic group forming a bridge of the following formula:

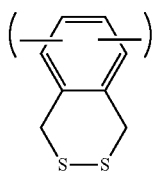

one of the carbon atoms of the benzene ring (illustrated by a bond intercepting a carbon-carbon bond of the ring) being bound to a recurrent unit of formula (XV) and another carbon atom of the benzene ring (illustrated by the other bond intercepting a carbon-carbon bond of the ring) being covalently bound to the carbonaceous material.

Such a compound bound to a carbonaceous material may notably fit the following formula:

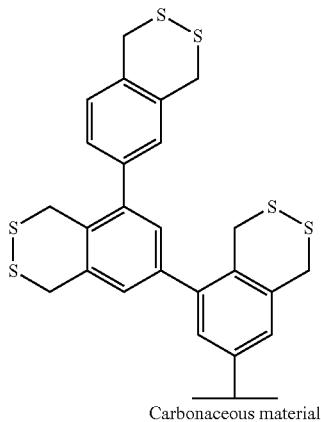 [SMILES: CC(C)c1cc2c(c(-c3cc4c(c(-c5ccc6c(c5)CSSC6)c3)CSSC4)c1)CSSC2]

Carbonaceous material

For reasons of simplification, a single grafted compound has been illustrated in the formula above, being aware that it is understood that several compounds of this type are grafted covalently to the carbonaceous material.

From among the compounds comprising at least one ring comprising a disulfide group, the preferred compounds are those for which said ring includes 4 atoms (it being understood that two of these atoms are sulfur atoms).

Indeed, it was possible to ascertain that with compounds meeting this specificity, it is possible to both access a good specific capacity (for example of more than 400 mAh/g) and a high redox potential. This is notably the case of the compounds comprising a recurrent unit of formula (XI), (XII), (XIII) and (XIV) which respectively have a theoretical mass capacity (expressed in mAh/g) of 526, 471, 426 and 426, these mass capacities being quite competitive if they are compared with that of LiFePO$_4$, a material currently used for entering the structure of the positive electrodes (which has a capacity of 170 mAh/g).

Furthermore, it will be noted that the presence of aromatic rings in the explained compounds mentioned above (in particular, those of formulae (I) to (XV)) may ensure electron conduction for the electrons from the carbonaceous material, during operation of the lithium accumulator, this conduction being made possible by the presence of carbon atoms in the hybridization state sp$^2$.

For the different compounds mentioned above, it is understood that they should have a reduced form, which, in the case of the compounds with a disulfide group, is materialized by an opening of the disulfide bond. Thus, as an example, for the compound of formula (VII), the reduced form of the latter corresponds to:

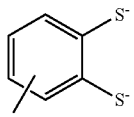

the bond intercepting the carbon-carbon bond of the benzene ring indicating that the binding between the benzene ring and the carbonaceous material is ensured by one of the carbon atoms of this ring.

Thus, for the compounds comprising at least one ring comprising a disulfide group, the existence of the disulfide group will allow the electrochemical reaction to occur by breaking S-S bonds, while retaining an anchoring point on the carbonaceous material, thereby avoiding dissolution of the active material into the electrolyte with which the material is intended to be put into contact.

As mentioned below, the carbonaceous material may consist in carbon nanotubes, in graphene or a derivative of graphene selected from graphene oxides, reduced graphene oxides.

By graphene, it is specified that in a strict sense, this is a single plane crystal appearing as a carbon plane (or carbon sheet), where the atoms are positioned according to a regular order of a hexagonal structure, the thickness of this plane (or sheet) corresponding to that of a corresponding carbon atom thus to a thickness of less than one nanometer, which does not exclude the possible coexistence with multiple layers (for example from 2 to 10 layers), in which case this is referred to as few layer graphene» (also known under the acronym FLG).

As regards carbon nanotubes, these may be single-wall carbon nanotubes (known under the acronym of SWNT) or multi-wall carbon nanotubes (known under the acronym of MWNT).

The negative electrode of the accumulators of the invention may for example comprise lithium in a metal form and, according to a particular embodiment, may be in lithium metal (which means that it does not comprise any other ingredients) or else may comprise a material capable of inserting and de-inserting lithium, such as a carbonaceous material like graphite, an oxide material like Li$_4$Ti$_5$O$_{12}$ or an element capable of forming an alloy with lithium, such as silicone or tin.

The positive electrode as for it may comprise in addition to the specific positive electrode material defined above, for example, a binder, like a polymeric binder (such as polyvinylidene fluoride, cellulose) so as to improve the strength of the electrode.

The positive electrode may also exclusively consist in a material according to the invention.

The electrolyte, as for it, may generally comprise a lithium salt, for example, selected from LiClO$_4$, LiAsF$_6$, LiPF$_6$, LiBF$_4$, LiRfSO$_3$, LiCH$_3$SO$_3$, LiN(RfSO$_2$)$_2$, Rf being selected as F or a perfluoroalkyl group including from 1 to 8 carbon atoms, lithium trifluoromethanesulfonylimide (known under the acronym of LiTFSI), lithium bis(oxalato) borate (known under the acronym of LiBOB), lithium bis (perfluoroethylsulfonyl)imide (also known under the acronym of LiBETI), lithium fluoroalkylphosphate (known under the acronym of LiFAP).

The lithium salt is preferably dissolved in an aprotic polar solvent, for example, an aprotic polar solvent selected from carbonate solvents, ether solvents, ester solvents, sulfone solvents and nitrile solvents.

Further, the electrolyte may be led to impregnating at least one separator element positioned between both electrodes of the accumulator.

The positive electrode materials used in the accumulators according to the invention may be prepared by a method comprising the following steps:

a) a step for putting a carbonaceous material in contact with an organic compound comprising at least one electron attractor group or a precursor of the latter and at least one other group, which is a group of the cleavable salt type;

b) a step for grafting by covalence the compound comprising at least one electron attractor group to the carbonaceous material or precursor of the latter by cleavage of the group of the cleavable salt type mentioned above; and c) when the compound comprises a precursor group of the electron attractor group, a step for transforming the precursor group into said electron attractor group.

By «group of the cleavable salt type» is conventionally meant within the scope of the invention, a group selected from the group formed by diazonium salts, ammonium salts, phosphonium salts, iodonium salts and sulfonium salts, which salt is able to be cleaved during a grafting step.

Schematically, the group of the cleavable salt type may be represented by the formula:

-A⁺X⁻ wherein:

A⁺ represents a monovalent cation; and

X⁻ represents a monovalent anion, which may notably be selected from inorganic anions such as halides like I⁻, Br⁻ and Cl⁻, haloborates, such as tetrafluoroborate, perchlorates, sulfonates and organic anions such as alcoholates and carboxylates.

The organic compound comprising at least one electron attractor group or precursor of the latter and at least one other group, which is a group of the cleavable salt type, may be a compound comprising one or several cyclic groups, for example, one or several aryl groups, for which at least one of these groups bears at least one electron attractor group and said at least one of these groups bears at least one group of the cleavage salt type, such as a diazonium group.

As an example, this may be a compound further comprising as an electron attractor group, a carbonyl group.

For example mention may be made of quinone compounds bearing at least one diazonium group, such as a compound of the following formula:

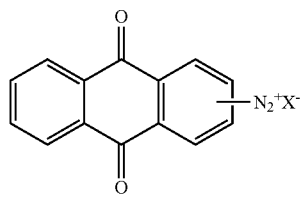

with X⁻ being as defined above, X⁻ may notably be a tetrafluoroborate anion, the group $N_2^+X^-$ may be bound to any of the carbon atoms of the two benzene rings.

During step b), these cleavable salts are capable under certain non-electrochemical or electrochemical conditions, of forming, by cleavage, during step b), species able to participate in chemical reactions, in return for which they are covalently grafted to the carbonaceous material.

According to a first alternative, the grafting step may consist in a radical chemical grafting under non-electrochemical conditions.

By «non-electrochemical conditions», is meant within the scope of the present invention in the absence of electric voltage. Thus, the non-electrochemical conditions applied are conditions which allow the formation of radical entities from the compound comprising, inter alia, at least one group of the cleavable salt type, in the absence of the application of any electric voltage at the carbonaceous material onto which the compound is intended to be grafted. These conditions involve parameters such as for example the presence of a reducing agent.

The term of «radical chemical grafting» notably refers to the use of extremely reactive, typically radical molecular entities capable of forming bonds of the covalent bond type with the carbonaceous material, said molecular entities being generated independently of the surface onto which they are intended to be grafted. Thus, the grafting reaction leads to the formation of covalent bonds between the area of the surface of the carbonaceous material onto which the compound has to be grafted and the radical entity resulting from the cleavage of the aforementioned group of the cleavable salt type.

As an example, when the group of the cleavage salt type is a diazonium group, the grafting step, and more specifically for radical chemical grafting, may consist in a step for reducing the diazonium group with a reducing agent, in return for which there is a release of nitrogen $N_2$, the resulting compound being a radical compound (the free radical being formed on the carbon initially bearing the diazonium group) which reacts with the carbonaceous material in order to form a covalent bond. The reducing agent may notably be a metal, such as iron, sodium ascorbate or hypophosphorous acid.

As an illustration, the reaction scheme of such a reaction with a specific compound may be the following:

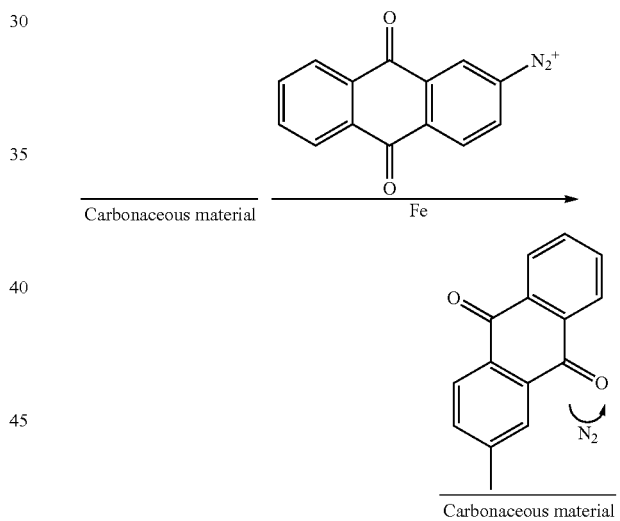

For reasons of simplification, a single grafted compound has been illustrated in the formula above, being aware that it is assumed that several compounds of this type are grafted, covalently, to the carbonaceous material.

According to a second alternative, the grafting step may consist in electrochemical grafting.

Conventionally within the scope of the present invention by electrochemical grafting is meant an electro-initiated and localized grafting of the compound comprising at least one group of the cleavable salt type on the carbonaceous material. In this method, the carbonaceous material is brought to a potential greater than or equal to a threshold electric potential determined with respect to a reference electrode, said threshold electric potential being the potential beyond which grafting occurs of the compound comprising at least one group of the cleavable salt type. The application of this potential notably allows biasing of the carbonaceous material while reducing the compound bearing at least one group of the cleavable salt type. It is specified that, according to the nature of the aforementioned compound, once grafted, it may have another reactive function towards another radical and able to trigger radical polymerization which does not depend on any electric potential.

This alternative of the present invention may be applied in an electrolysis cell including different electrodes: a working electrode formed by the carbonaceous material, a counter-electrode, for example a platinum electrode, as well as a reference electrode, for example an electrode of the $Ag/AgNO_3$ type and comprising an electrolyte consisting in an organic solution comprising a salt (such as a lithium salt) and the compound comprising, inter alia, at least one group of the cleavable salt type, the conditions applied for the electrochemical grafting may be those of cyclic voltammetry or of chronopotentiometry, for which a number of cycles is applied until reduction or even preferably disappearance of the reduction peak of the group of the cleavable salt type (the latter being located for example around 0.45 V vs. $Ag/AgNO_3$ when this group is a diazonium group), the reduction of the group being an indication that the compound is properly grafted onto the carbonaceous material.

According to the method of the invention, the organic compound comprising at least one electron attractor group or a precursor of the latter and at least one other group, which is a group of the cleavable salt type, may be prepared before step a) and notably directly in the presence of the carbonaceous material (in which case this may be referred to as a preparation in situ).

When these compounds include inter alia a group of the cleavable salt type, which is a diazonium group, they may be prepared by reaction of corresponding amine compounds (i.e. compounds comprising an amine group in the place of the future diazonium group) with $NaNO_2$ in an acid medium or with $NOBF_4$ in an organic medium.

From among the positive electrode materials which may enter the structure of the accumulators of the invention, some of them are original materials, these materials being positive electrode materials for a lithium accumulator comprising a carbonaceous material selected from carbon nanotubes, graphene or derivatives of graphene selected from graphene oxides, reduced graphene oxides, said carbonaceous material is functionalized covalently with at least one organic compound comprising at least one electron attractor group, which is a disulfide group.

Such an organic compound may notably be part of the family of cyclic compounds including one or several rings, in which at least one ring includes a disulfide group.

Compounds fitting this specificity may be cyclic compounds comprising at least one aromatic ring beside at least one ring comprising a disulfide group.

Such compounds may fit one of the following formulae (VII) to (X):

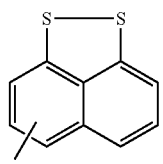
(VII)

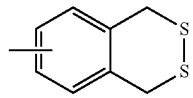
(VIII)

-continued

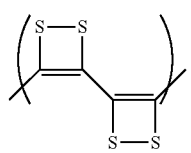
(IX)

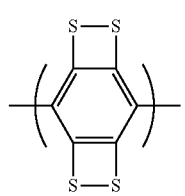
(X)

The bond intercepting the carbon-carbon bond indicating that the bond between the benzene ring(s) and the carbonaceous material is accomplished by one of the carbon atoms of this or these rings; these compounds respectively having the following standard potentials calculated with the counter-ion $Li^+$ in acetonitrile (vs. $Li^+/Li$): 2.78; 1.88; 1.82 and 1.73.

Compounds fitting this specificity may also be compounds of the «polymer» type comprising at least one recurrent unit, said recurrent unit comprises one or several rings, for which one of the rings is a ring comprising a disulfide group.

More specifically, such compounds may comprise at least one recurrent unit fitting one of the following formulae (XI) to (XV):

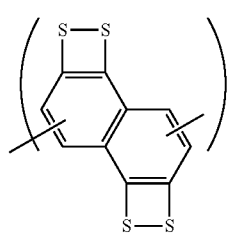
(XI)

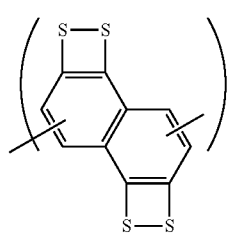
(XII)

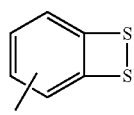
(XIII)

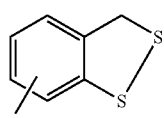
(XIV)

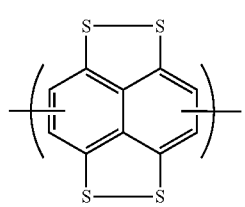

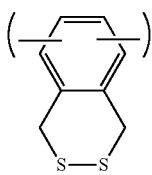
(XV)

Said recurrent units may be bound to the carbonaceous material via an organic group forming a bridge between the relevant recurrent unit and the carbonaceous material, both bonds intercepting the carbon-carbon bonds for the formulae (XIII) to (XV) indicating that the latter are bound to one of the carbon atoms of the benzene ring, for which they intercept the carbon-carbon bond.

As an example, when the recurrent unit is a recurrent unit of the aforementioned formula (XV), the compound comprising such a recurrent unit may be bound to the carbonaceous material through an organic group forming a bridge of the following formula:

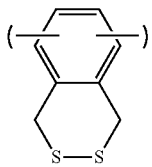

One of the carbon atoms of the benzene ring (illustrated by a bond intercepting a carbon-carbon bond of the ring) is bound to a recurrent unit of formula (XV) and another carbon atom of the benzene ring (illustrated by the other bond intercepting a carbon-carbon bond of the ring) being covalently bound to the carbonaceous material.

Such a compound bound to a carbonaceous material may notably fit the following formula:

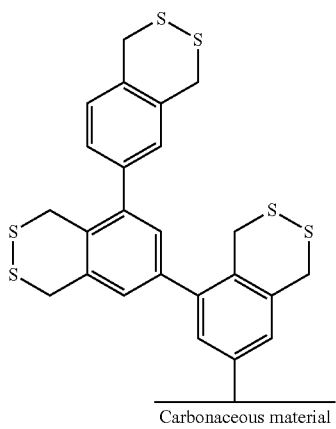 [SMILES: CC(C)c1cc2c(c(-c3cc4c(c(-c5ccc6c(c5)CSSC6)c3)CSSC4)c1)CSSC2]

For reasons of simplification, a single grafted compound has been represented in the formula above, being aware that it is assumed that several compounds of this type are covalently grafted to the carbonaceous material.

From among the compounds comprising at least one ring comprising a disulfide group, the preferred compounds are those for which said ring includes 4 atoms (it being understood that two of these atoms are sulfur atoms).

Finally, the invention relates to a positive electrode comprising a positive electrode material comprising a material as defined above.

Other features will become better apparent upon reading the additional description which follows, which relates to examples for making materials according to the invention.

Of course, the examples which follow are only given as an illustration of the object of the invention and by no means are a limitation of this object.

The invention will now be described with reference to the particular embodiment defined below with reference to the appended figures.

SHORT DESCRIPTION OF THE DRAWINGS

DETAILED DISCUSSION OF PARTICULAR EMBODIMENTS

EXAMPLE 1

This example illustrates the preparation of a carbonaceous material according to the invention consisting in covalently functionalized multi-walled carbon nanotubes, by polymers comprising as a recurrent unit, a recurrent unit of the following formula:

Both bonds intercepting the carbon-carbon bonds indicating that the latter are bound to one of the carbon atoms of the benzene ring, for which they intercept the carbon-carbon bond, the polymer resulting from the recurrence of said recurrent unit being bound to the carbonaceous material via an organic group forming a bridge between the relevant recurrent unit and the carbonaceous material, this organic group forming a bridge fitting the following formula:

The bond intercepted by a bracket indicating that the group is bound to the wall of the carbon nanotubes through a carbon atom of the benzene ring, the other bond intercepting the benzene ring indicating that the group is bound to another recurrent unit.

To do this, it is proceeded with the application of the following steps:
  a step for purifying the carbon nanotubes (step a);
  a step for preparing a diazoanthraquinone compound (step b);
  a step for grafting the diazoanthraquinone compound via a chemical route (step c) or via an electrochemical route (step d).

a) Purification of the Carbon Nanotubes

The carbon nanotubes used are multi-walled carbon nanotubes (NC-3100), obtained from Nanocyl.

In order to purify them, they are dispersed in 65% nitric acid by sonication for 30 minutes. The mixture is then refluxed to 110° C. for 8 hours. This mixture is then filtered on a polytetrafluoroethylene membrane (having a pore size of 0.45 μm) for recovering the carbon nanotubes. The latter are then re-dispersed in a 0.5 M soda NaOH solution by sonication for 30 minutes, and they are again recovered by filtration, washed with water and then with a 1 M hydrochloric acid solution. Finally, they are again rinsed with water, with acetone and then with diethyl ether.

b) Preparation of a Diazoanthraquinone Compound

The diazoanthraquinone compound is prepared from 2-aminoanthraquinone according to the following reaction scheme:

The diazoanthraquinone compound is thus prepared by reducing 2-aminoanthraquinone with an excess of nitrosonium tetrafluoroborate $NOBF_4$ in the dichloromethane at 0° C. for 2 hours.

The solvent is then evaporated and the resulting product is dried in vacuo.

Figure 1:
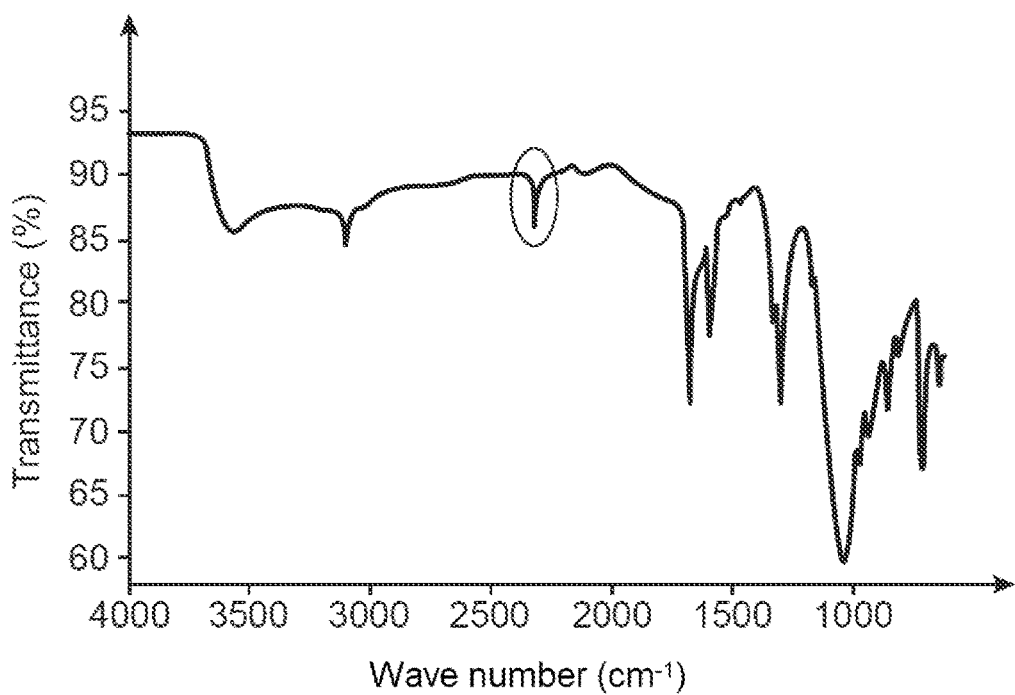
FIG. 1 is an infrared spectrum obtained for the product of Example 1 (part b).

The obtained product is analysed by infrared spectroscopy, the obtained spectrum being illustrated in FIG. 1 illustrating the time-dependent change in the transmittance (in %) versus the wave number (in $cm^{-1}$).

The band at 2,300 $cm^{-1}$ is the signature of the presence of diazo $N_2^+$ functions.

c) Chemical Grafting of the Diazoanthraquinone Compound

The grafting of the diazoanthraquinone compound prepared in step b) is carried out by reducing the diazonium function, in return for which there is removal of $N_2$ and concomitant formation of an anthraquinone polymer around carbon nanotubes as explained at the beginning of Example 1.

To do this, the carbon nanotubes purified in step a) are dispersed in N-methyl-2-pyrrolidone by sonication for 30 minutes.

The diazoanthraquinone compound prepared according to step b) is then added according to a content of 1 equivalent per carbon (i.e. one molecule per carbon atom) followed by a spatula touch of iron powder.

The dispersion is stirred for 12 hours.

The nanotubes are then recovered by filtration on a polytetrafluoroethylene membrane (having a pore size of 0.45 μm) and then washed with 1 M hydrochloric acid and then with water.

The procedure is repeated once again entirely.

The thereby grafted carbon nanotubes are finally dried in vacuo.

d) Electrochemical Grafting of the Diazoanthraquinone Compound

In order to graft the diazoanthraquinone compound via an electrochemical route, a three electrode system is used, comprising:
  a working electrode consisting of carbon nanotubess prepared in step a), this electrode appearing as a disc in carbon nanotubes, which disc has a diameter of 16 mm and a thickness of 10-20 micrometres;

a platinum counter-electrode appearing as a platinum wire;

a reference electrode consisting in a massive silver wire put into contact with an $AgNO_3$ solution ($10^{-3}$ M) in acetonitrile;

an electrolyte consisting in acetonitrile containing lithium perchlorate $LiClO_4$ (0.1 M) and the saturated diazoanthraquinone compound.

Figure 2:
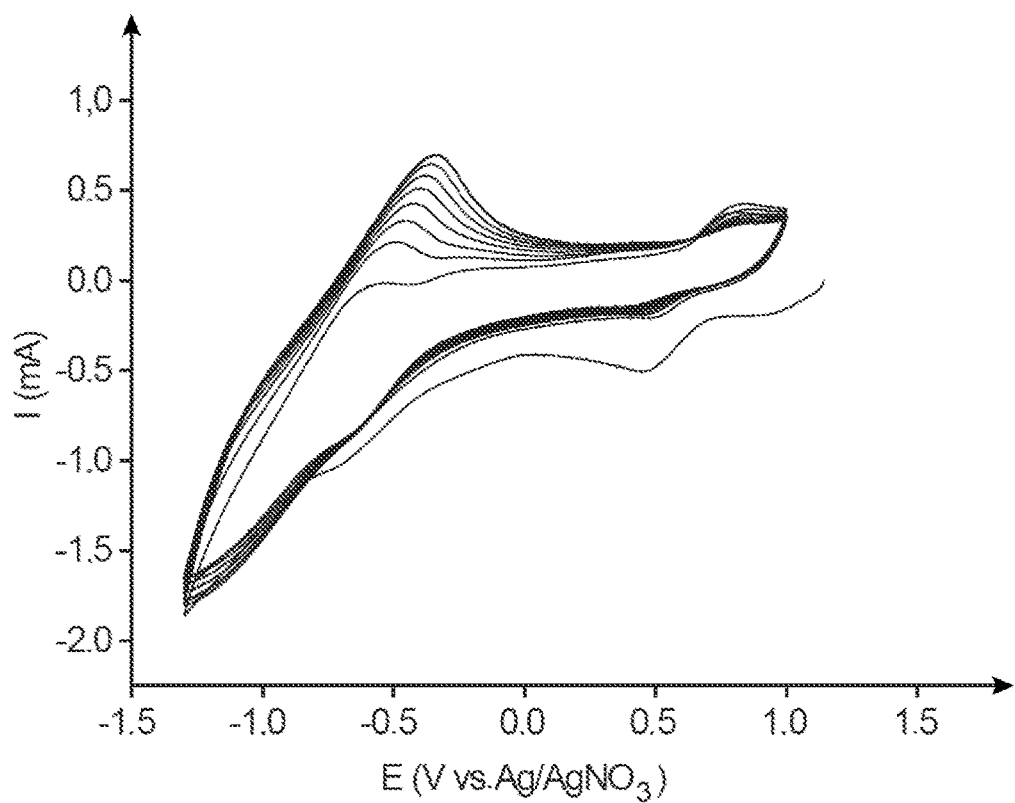
FIG. 2 is a diagram illustrating the obtained cycling curves, by cyclic voltammetry, with the material obtained in Example 1 (part d).

After degassing the electrolyte by $N_2$ bubbling, the system is subject to cyclic voltammetry, consisting of carrying out cycling between −1.25 to +1 V/Ag—$Ag^+$ ($10^{-3}$ M in acetonitrile) at a sweep rate of 100 $mV.s^{-1}$, the number of performed cycles being 10, the cycling curves being illustrated in FIG. 2 (I expressed in mA versus the potential E expressed in V). In this figure, a reduction peak at −0.45 V may be observed which corresponds to the peak for reducing the diazonium function.

EXAMPLE 2

In this example, is illustrated the preparation of a lithium accumulator as a button battery comprising, as a positive electrode, the electrode formed with a material obtained in Example 1.

The accumulator was assembled in a glove box under an inert argon atmosphere.

Figure 3:
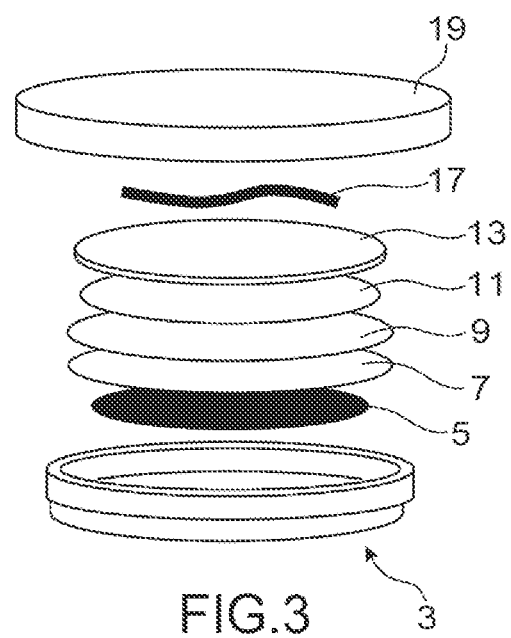
FIG. 3 is an illustration in an exploded view, of the lithium accumulator prepared according to Example 2.

The accumulator was made as illustrated in the appended FIG. 3, by beginning with the positive electrode and finishing with the negative electrode, the different elements of the accumulator being the following in this order:

a casing bottom 3;

a seal gasket 5;

a positive electrode 7 appearing as a disc of carbon nanotubes as described in Example 1;

a disc of Viledon® 9 (which is a membrane in non-woven fibres of polyolefins (polypropylene/polyethylene)) and a disc of Celgard® 11 (which is a polypropylene membrane);

a negative electrode 13 in lithium metal as a disc having a diameter of 16 mm;

a shim (not shown) and a spring 17; and a lid 19.

The electrolyte impregnates both aforementioned separator discs as well as the porosity of the positive electrode. It consists in an organic electrolyte comprising a mixture of solvents, tetraethylene glycol dimethylether (TEGDME)/1,3-dioxolane (DIOX) 50/50 comprising a lithium salt, lithium bis(trifluoromethanesulfonyl)imide (LiTFSI) 1 M.

The aforementioned inert atmosphere is used in order to avoid any reaction of the lithium metal making up the negative electrode and of the electrolyte with water and the oxygen of ambient air.

Figure 4:
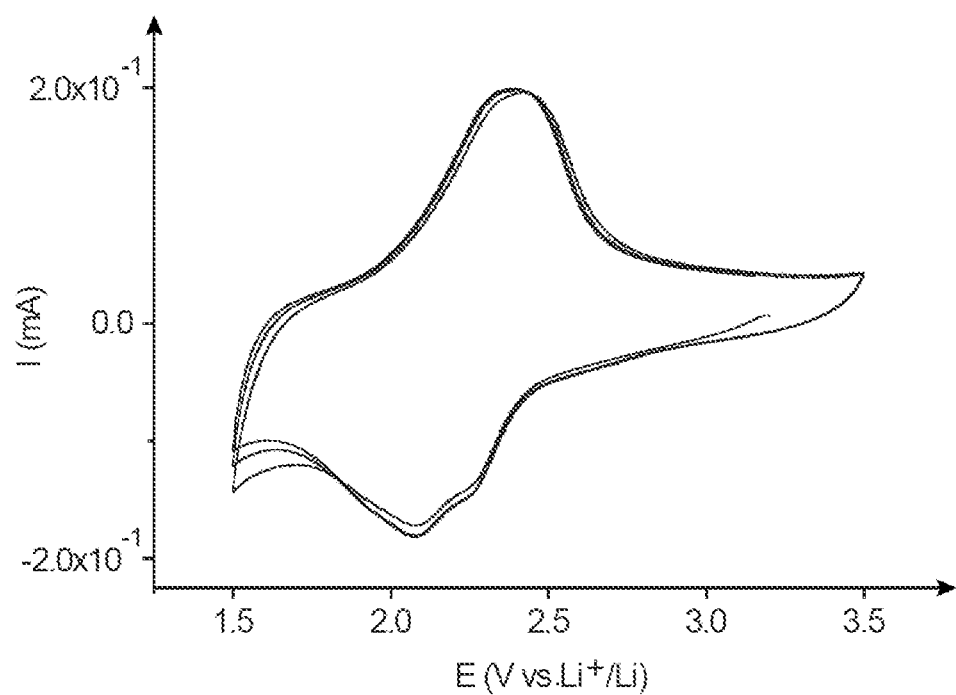
FIG. 4 is a diagram illustrating the obtained cycling curves by cyclic voltammetry, with the accumulator prepared in Example 2.

The resulting accumulator is subject to a cyclic voltammetry test, consisting of carrying out cycling between +1.5 to +3.5 V/Li—$Li^+$ at a sweep rate of 10 $mV.s^{-1}$, the number of performed cycles being at most 50, an example of cycling curves being illustrated in FIG. 4 (I expressed in mA versus the potential E expressed in V)). In this figure a reduction peak at 2.10 V vs. $Li^+$/Li may be observed, which corresponds to the reduction peak of the carbonyl functions of the anthraquinone group.

Indeed, it is possible to confirm with certainty that the peak at 2.10 V vs. $Li^+$/Li corresponds to the peak of the carbonyl functions of the anthraquinone group with the following tests:

a cyclic voltammetry test with non-grafted carbon nanotubes as a working electrode (said to be test A below); and a cyclic voltammetry test with glassy carbon as a working electrode in order to test the electrochemical signature of non-grafted anthraquinone (said to be test B, below).

For test A, the experimental conditions are the following.

A three electrode system is used, comprising:

a working electrode consisting of purified carbon nanotubes according to step a) of Example 1, said electrode appearing as a disc with a diameter of 16 mm and a thickness of 10-20 micrometers;

a platinum counter-electrode consisting in platinum wire;

a reference electrode consisting in a massive silver wire put into contact with an $AgNO_3$ solution ($10^{-3}$ M) in acetonitrile;

an electrolyte consisting in acetonitrile containing lithium perchlorate $LiClO_4$(0.1 M).

Figure 5:
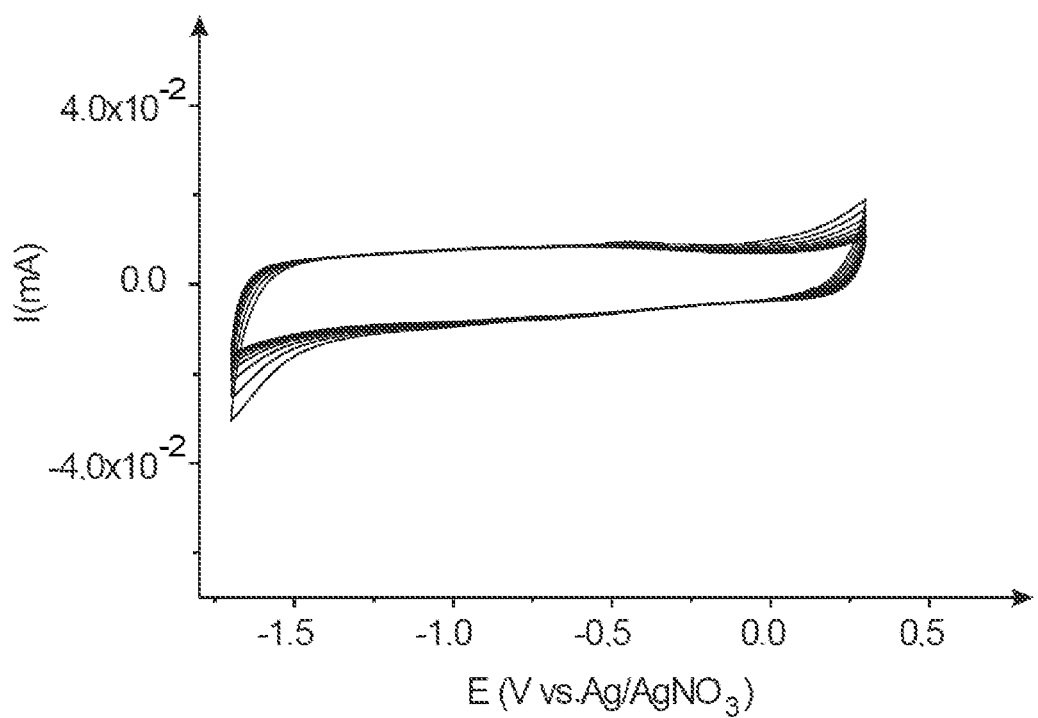
FIG. 5 is a diagram illustrating the obtained cycling curves by cyclic voltammetry, with the system of test A of Example 2.

After degassing the electrolyte by $N_2$ bubbling, the system is subject to cyclic voltammetry, consisting of carrying out cycling between −1.5 to +0.25 V/Ag—$Ag^+$ ($10^{-3}$ M in acetonitrile) at a sweeping rate of 100 $mV.s^{-1}$, as the number of cycles carried out is 10, the cycling curves are illustrated in FIG. 5 (I is expressed in mA versus the potential E expressed in V).

No peak is observed on these curves.

For test B, the experimental conditions are the following.

A three electrode system is used comprising:

a working electrode consisting of glassy carbon appearing as a disc with a diameter of 3 mm;

a platinum counter-electrode consisting in platinum wire;

a reference electrode consisting in a massive silver wire put into contact with an $AgNO_3$ solution ($10^{-3}$M) in acetonitrile;

an electrolyte consisting in acetonitrile containing lithium perchlorate $LiClO_4$(0.1 M) and anthraquinone $10^{-3}$ M.

Figure 6:
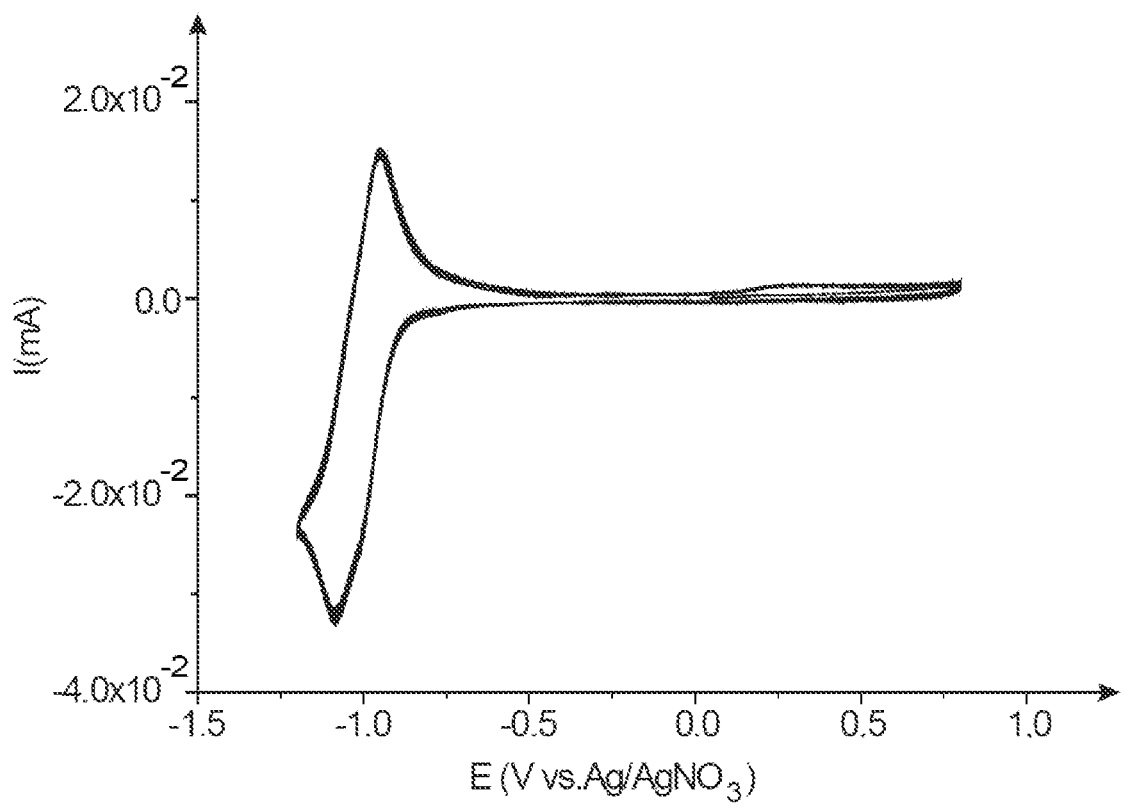
FIG. 6 is a diagram illustrating the obtained cycling curves, by cyclic voltammetry, with the system of test B of Example 2.

After degassing the electrolyte by $N_2$ bubbling, the system is subject to cyclic voltammetry, consisting of carrying out cycling between −1.0 to +1.02 V/Ag—$Ag^+$ ($10^{-3}$ M in acetonitrile) at a sweeping rate of 100 $mV.s^{-1}$, the number of performed cycles being 5, the cycling curves are illustrated in FIG. 6 (I is expressed in mA versus the potential E expressed in V).

Conventional curves of a reversible electrochemical system are observed and having a reduction peak at −1.10 V vs. $Ag/Ag^+$ ascribable to carbonyl functions (reduction wave of $2e^-$) of the anthraquinone compound, this peak, reduced to the $Li/Li^+$ system corresponding to a peak at +2.10 V.

Thus, it may be inferred without any ambiguity that, with the button battery according to the invention, the peak at +2.10 V is actually due to the anthraquinone compounds grafted to the surface of the carbon nanotubes.

Figure 7:
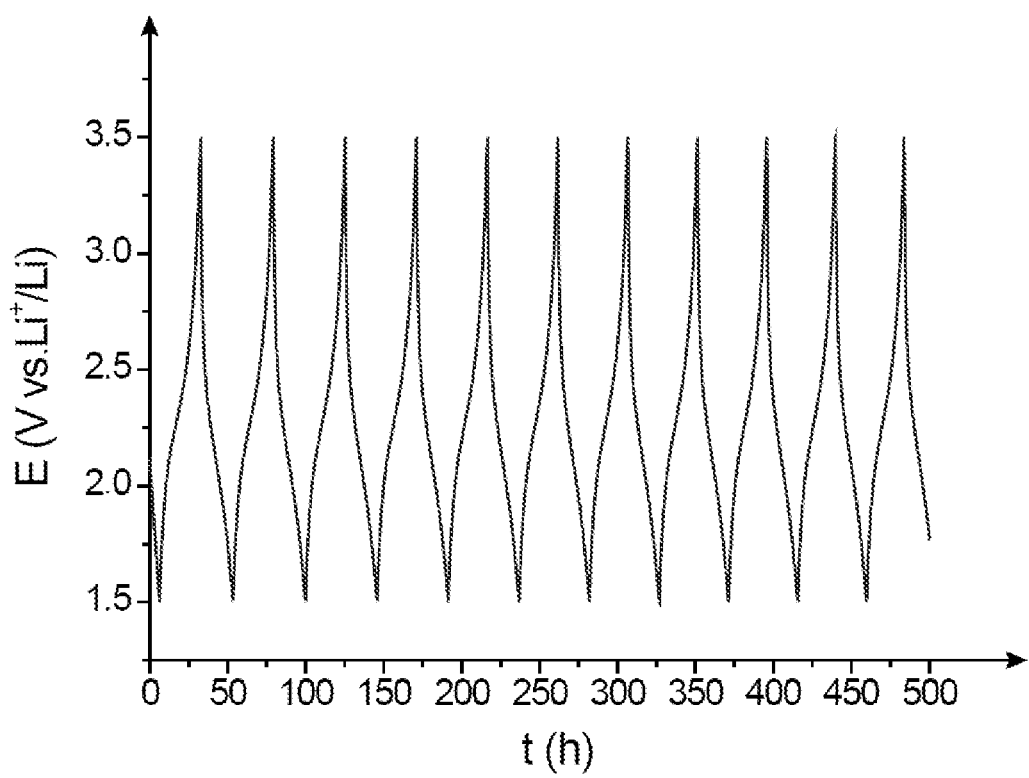
FIG. 7 is a diagram illustrating obtained charging-discharging curves, at constant intensity (10 μA i.e. 5 mg.g$^{-1}$ for the tested samples), with the accumulator prepared according to Example 2.

In parallel, charging/discharging profiles were recorded with the accumulator according to the invention prepared according to this example, upon applying a current of 10 μA, these profiles being copied in FIG. 7. The charging/discharging curves have a quite similar profile over time, which confirms the excellent resistance to cycling.

As a comparison, charging/discharging profiles were also carried out under conditions similar to those listed above, except that non-grafted carbon nanotubes were used as an electrode material, which gave the possibility of demonstrating the significant contribution of the grafted anthraquinone compound. Indeed, specific capacities up to 20 times greater were able to be obtained for the accumulator according to the invention.

Figure 8:
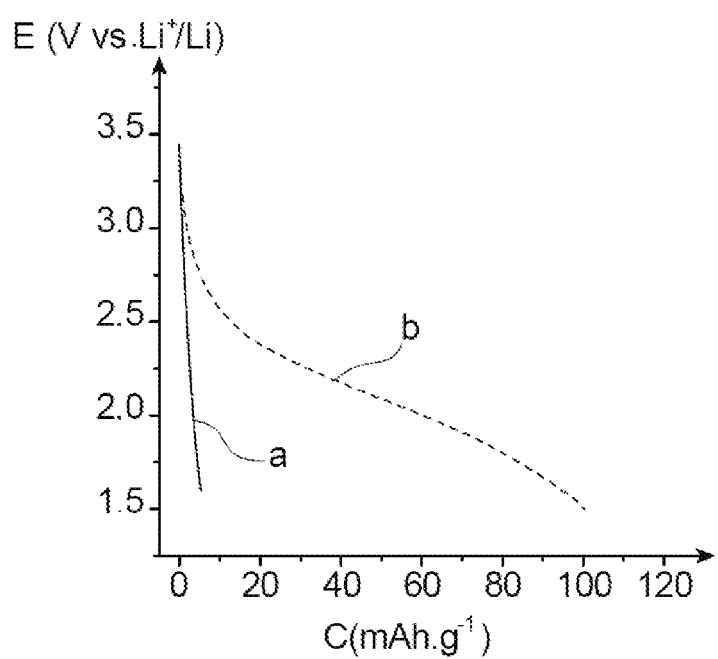
FIG. 8 is a diagram illustrating the time-dependent change of the potential E (V vs. Li$^+$/Li) according to the discharge capacity C (in electrode mAh.g$^{-1}$) with accumulators prepared according to Example 2.

Finally, tests by applying a 10 µA current (i.e. 5 mAh.g$^{-1}$ of electrode capacity) and by measuring the time-dependent change of the potential E (V vs. Li$^+$/Li) versus the discharging capacity (in electrode mAh.g$^{-1}$) (curve a) for non-grafted nanotube batteries and curve b) for grafted nanotube batteries (cf. FIG. 8) gave the possibility of determining that specific capacities up to 20 times greater were able to be obtained for button batteries using grafted nanotubes. Thus, values of the order of 100 mAh.g$^{-1}$ of electrode capacity for batteries using grafted nanotubes were able to be observed, versus 5 mAh.g$^{-1}$ of electrode capacity for batteries using non-grafted nanotubes. As the operating potential is located around 2.2 V vs. Li$^+$/Li, a mass energy density of about 230 Wh.g$^{-1}$ may be extrapolated.

Figure 9:
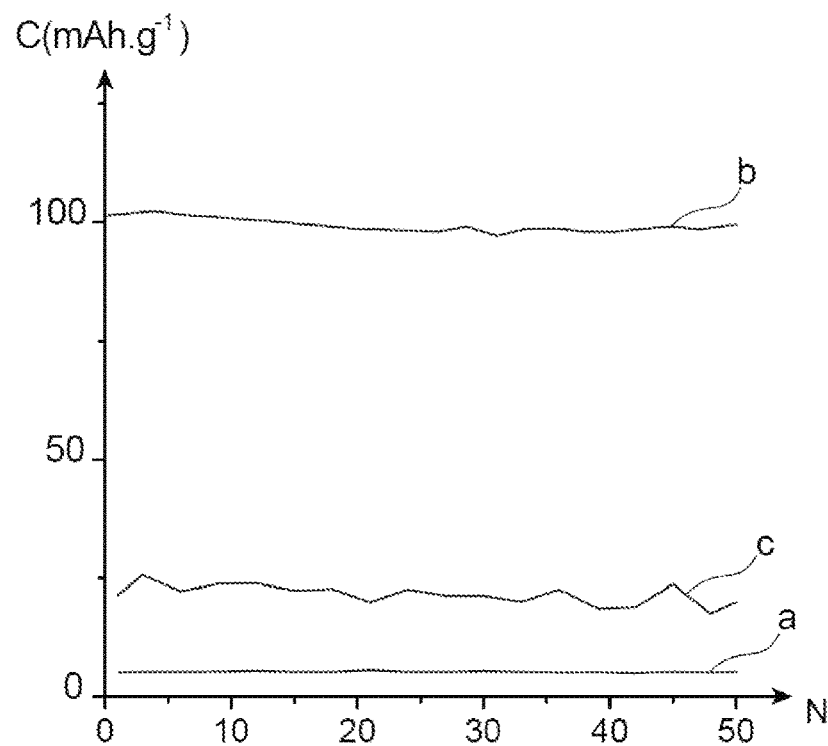
FIG. 9 is a diagram illustrating the time-dependent change in the discharge capacity C (in electrode mAh.g$^{-1}$) according to the number of cycles N for three button batteries prepared according to Example 2.

Finally, other tests were conducted with both aforementioned button batteries and with a third button battery, the positive electrode of which comprises a mixture comprising non-grafted nanotubes and anthraquinone molecules. These tests consisted in measuring the time-dependent change of the discharging capacity C (in electrode mAh.g$^{-1}$) versus the number of cycles for these three button batteries and the results are copied in FIG. 9 (curve a respectively) for batteries with non-grafted nanotubes, curve b) for batteries with grafted nanotubes and curve c) for batteries with a mixture (non-grafted nanotubes+anthraquinone molecules).

Curve c) indicates the obtaining of a clearly smaller specific capacity (around 25 mAh.g$^{-1}$ of electrode capacity) for identical experimental conditions. Indeed, the active material not grafted to the nanotubes is partly dissolved in the electrolyte and causes a significant loss of capacity.

On the contrary, for samples of covalently functionalized nanotubes with the anthraquinone molecule (curve b), excellent stability is observed after 50 cycles. Other tests gave the possibility of demonstrating that this capacity may be maintained at 80% of its initial value even after 800 cycles.

«Post-mortem» tests were also conducted with the three aforementioned button batteries, consisting of disassociating them for analyzing the color of the electrolyte.

For the battery with grafted nanotubes and the battery with non-grafted nanotubes, no coloration of the electrolyte is observed.

For the battery with a mixture (non-grafted nanotubes+ sulfur-containing molecules), the electrolyte assumed a brown coloration, a sign of the dissolution of the anthraquinone molecule in the solvent.

These tests confirm that there is no dissolution of the active material in the case of covalent grafting of the anthraquinone molecule to the carbon nanotubes.

The proposed new cathode material therefore actually preserves the system from loss of capacity during cycling by immobilizing the active material at the positive electrode.

As a conclusion, the accumulator according to the invention has excellent resistance to cycling.

The covalent grafting preserves the system from loss of capacity during cycling by immobilizing the active material at the positive electrode, which means, in other words, that there is no dissolution of the active material into the electrolyte, unlike the other systems of the prior art.

EXAMPLE 3

This example illustrates the preparation of a compound comprising a precursor group of a disulfide electron attractor group and comprising a diazonium group, which compound is able to be grafted covalently to a carbonaceous material, such as carbon nanotubes.

This compound fits the following formula:

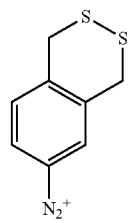

The preparation reaction scheme is the following:

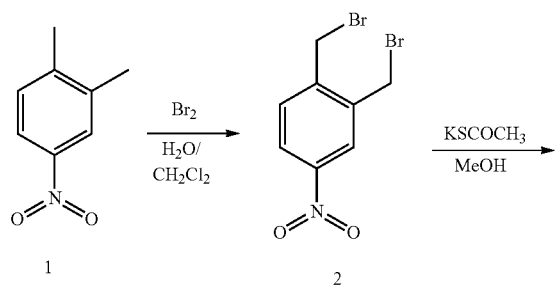

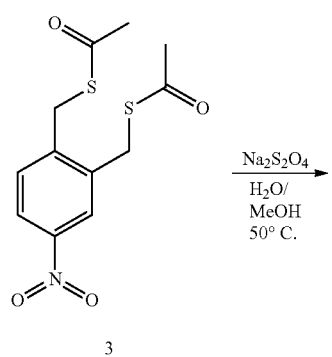

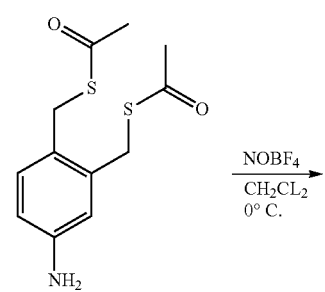

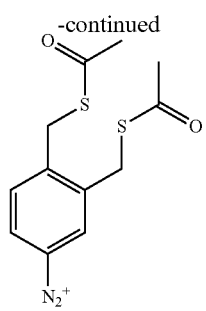

5

| NH$_4$OH
| MeOH
| Air
▼

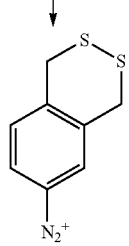

6

After dissolution of 1,2-dimethyl-4-nitrobenzene (compound 1; 5 g) in a water/dichloromethane mixture (50/50), two equivalents of Br$_2$ (3.4 ml) are added. The solution is stirred for 48 hours. After extraction, the organic phase is dried with Na$_2$SO$_4$. The organic solvent is evaporated and the product is dried in vacuo. The compound noted as 2 on the reaction scheme above is obtained as pale yellow crystals.

The compound 2 (4 g) is then dissolved in methanol (100 ml). To the resulting mixture is added an excess of KSCOCH$_3$ (4.4 g; 3 equivalents). The whole is stirred for 4 hours. The organic solvent is then evaporated. The resulting product is again dissolved in dichloromethane (100 ml) and washed with water. After extraction, the organic phase is dried with Na$_2$SO$_4$. The organic solvent is evaporated and the product is purified on a silica column (cyclohexane/ethyl acetate 10:1). The compound noted as 3 on the reaction scheme above is thereby obtained.

The compound 3 (1.9 g) is then dissolved in a water/ethanol mixture 50/50. To the resulting mixture is added an excess of Na$_2$S$_2$O$_4$ (5 g). The whole is stirred for 12 hours at 50° C. After extraction, the organic phase is dried with Na$_2$SO$_4$. The organic solvent is evaporated and the product is purified on a silica column (dichloromethane/methanol 99:1). The compound noted as 4 on the reaction scheme above is thereby obtained.

The compound 5 is obtained by reaction of the compound 4 (2 g) with NOBF$_4$ (1. 3g) in dichloromethane at 0° C. for 2 hours. The solvent is evaporated and the resulting product is dried in vacuo.

The compound 6 may be obtained, before grafting, by reaction with a solution of methanol hydroxide in air.

Next, carbon nanotubes were functionalized with a chemical grafting method similar to the one discussed in Example 1 for anthraquinone, two functionalization routes having been explored:

a functionalization route by grafting the compound 5 on carbon nanotubes, the grafting being followed by a transformation of the —S(COCH$_3$) groups into disulfide bridges by reaction with a solution of methanol hydroxide in air (a so-called route I);

a functionalization route by grafting the compound 6 directly on carbon nanotubes (a so-called route II).

For both of these routes, tracking by spectrometry of photoelectrons induced by x-rays (so-called XPS spectrometry) was carried out before and after grafting. While sulfur is not detected on non-functionalized nanotubes, a substantial amount is detected after grafting (5%), notably with the majority presence of a signal ascribable to the sulfur atoms bound to the carbon atoms in the grafted molecule.

After functionalization of the nanotubes with the sulfur-containing molecule, for both of these routes, the grafted and non-grafted samples were observed with a scanning electron microscope, showing the formation of a grafted polymer around the carbon nanotubes for the grafted samples, this grafted polymer for the carbon nanotubes obtained via route II fitting the following formula:

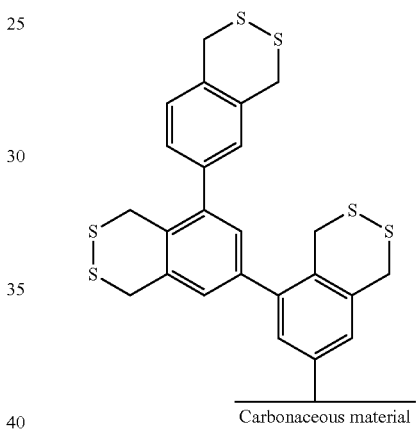

A single grafted compound has been represented for reasons of simplification, on the above formula, being aware that it is assumed that several compounds of this type are grafted covalently to the carbon nanotubes.

EXAMPLE 4

In this example, the electrochemical signature of the carbon nanotubes in a first phase was studied before and after grafting by cyclic voltammetry, the tested grafted nanotubes being those of the route II mentioned in Example 3 above.

To do this, a three electrode system was used, which system comprises:

a working electrode consisting of grafted or non-grafted carbon nanotubes, said electrode appearing as a disc with a diameter of 16 mm and a thickness of 10-20 micrometers;

a platinum counter-electrode consisting in a platinum wire;

a reference electrode consisting in a massive silver wire put into contact with an AgNO$_3$ solution ($10^{-3}$ M) in acetonitrile;

an electrolyte consisting in acetonitrile containing lithium perchlorate LiClO$_4$(0.1 M).

Figure 10:
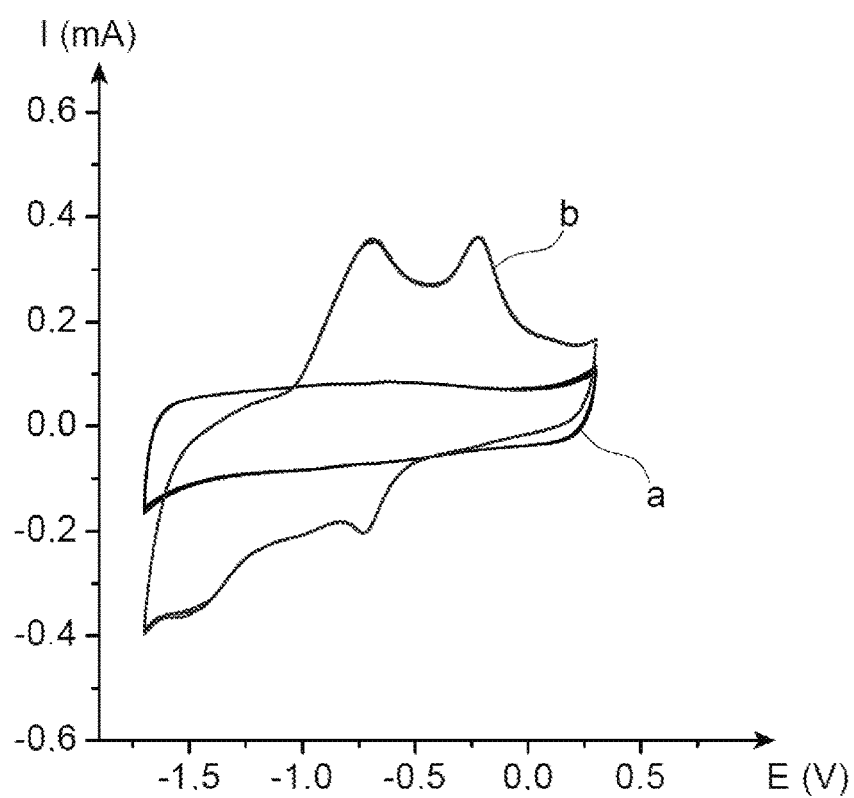
FIG. 10 is a diagram illustrating cyclic curves obtained from systems described in Example 4.

After degassing the electrolyte by $N_2$ bubbling, the system is subject to cyclic voltammetry, consisting of carrying out cycling between −1.5 to +0.25 V/Ag—Ag$^+$ ($10^{-3}$ M in acetonitrile) at a sweeping rate of 100 mV.s$^{-1}$, the cycling curves (I expressed in mA versus E expressed in V) being illustrated in FIG. 10 (curve a) for with the system with non-grafted nanotubes and curve b) with the system with grafted nanotubes.

For the system with non-grafted nanotubes, no activity is observed (curve a).

For the system with grafted carbon nanotubes, two reduction peaks and two re-oxidation peaks are observed (curve b), corresponding to the reduction and to the re-oxidation of the disulfide bridge at the sulfur-containing molecule, in other words upon opening and again closing this bridge. These results confirm the efficiency of the grafting method as well as the electrochemical activity of the grafted sulfur-containing molecule.

In a second phase, tests were conducted with two button batteries, a button battery comprising, as a positive electrode, an electrode formed with grafted carbon nanotubes and a button battery comprising, as a positive electrode, an electrode formed with non-grafted carbon nanotubes, respectively, the button batteries moreover fitting the same specificities as those described in Example 2.

Figure 11:
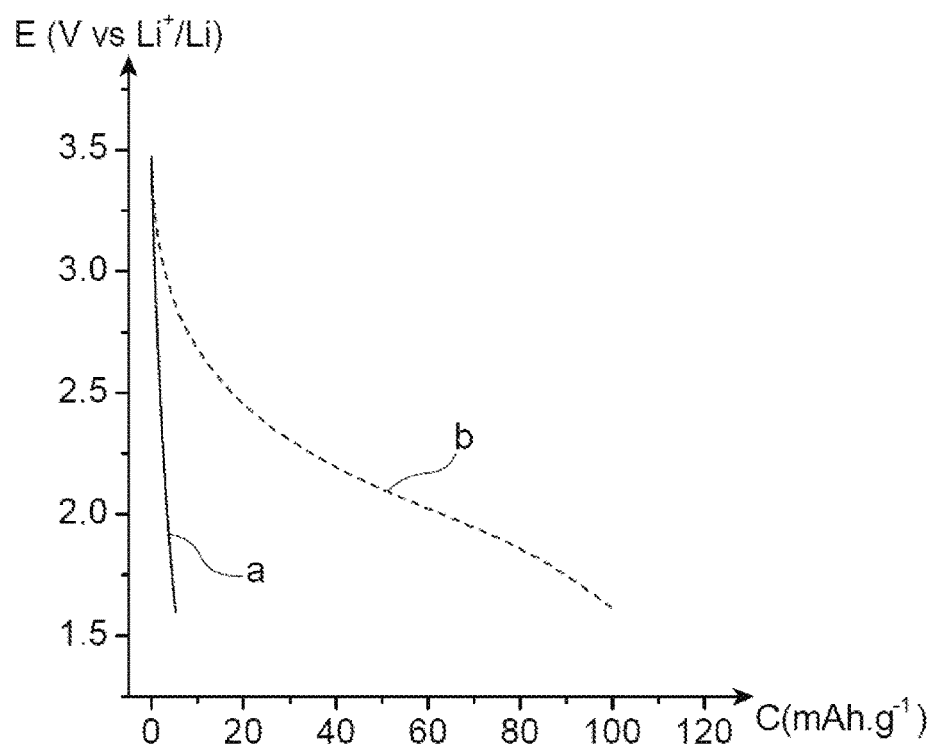
FIG. 11 is a diagram illustrating the time-dependent change of the potential E (V vs. Li$^+$/Li) according to the discharge capacity (in electrode mAh.g$^{-1}$) for button batteries described in Example 4.

In the tests, a current of 10 µA is imposed. Specific capacities up to 20 times greater were able to be obtained for button batteries using grafted nanotubes, as confirmed by FIG. 11, which illustrates the time-dependent change of the potential E (V vs. Li$^+$/Li) according to the discharging capacity (in mAh.g$^{-1}$ of electrode capacity) (curve a) for the batteries with non-grafted nanotubes and curve b) for the batteries with grafted nanotubes). Thus, values of the order of 100 mAh.g$^{-1}$ of electrode capacity for batteries using grafted nanotubes were able to be observed, versus 5 mAh.g$^{-1}$ of electrode capacity for batteries using non-grafted nanotubes. As the operating potential is located around 2.3 V vs. Li$^+$/Li, a mass energy density of about 230 Wh.g$^{-1}$ may be extrapolated. The coupled analyses of these results and XPS results gave the possibility of establishing that the whole of the grafted disulfide bridges is involved in the redox process during cycling.

Figure 12:
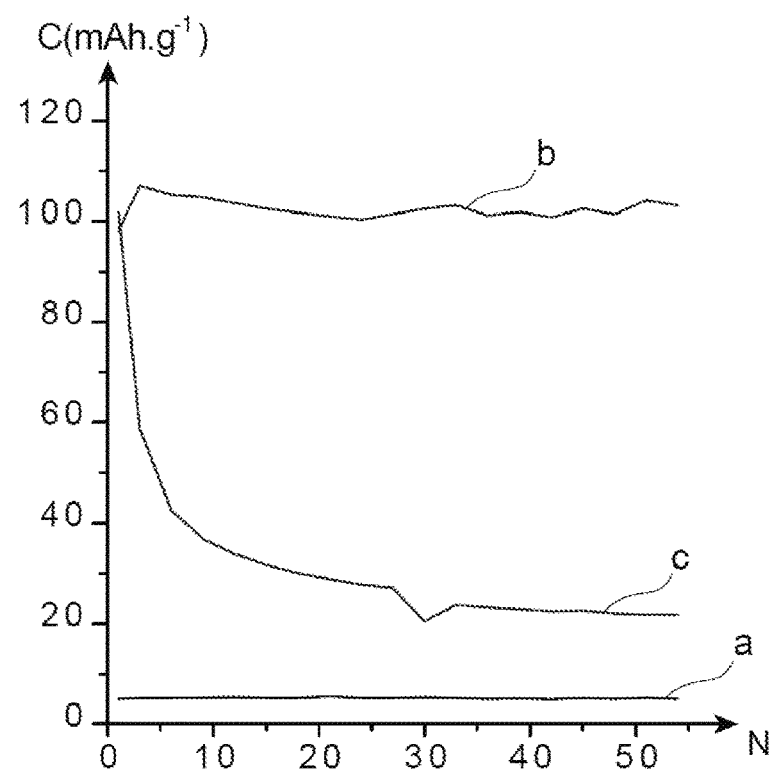
FIG. 12 is a diagram illustrating the time-dependent change in the discharge capacity C (in electrode mAh.g$^{-1}$) according to the number of cycles for three button batteries prepared according to Example 4.

In a third phase, other tests were conducted with both aforementioned button batteries and with a third button battery for which the positive electrode comprises a mixture between non-grafted nanotubes and the sulfur-containing molecules of formula (6) as defined in Example 3. These tests consisted of measuring the time-dependent change of the discharging capacity C (in mAh.g$^{-1}$ of electrode capacity) versus the number of cycles for these three button batteries and the results are copied in FIG. 12 (curve a) for batteries with non-grafted nanotubes, curve b) for batteries with grafted nanotubes and curve c) for batteries with a mixture (non-grafted nanotubes+sulfur-containing molecules), respectively.

For curve c), a very significant reduction in the specific capacity is observed during the first 5 cycles, the latter passing from 100 to about 40 mAh.g$^{-1}$ of electrode capacity. This decrease is due to the dissolution of a large portion of the active material in the electrolyte. The decrease, although clearly not as strong, continues during the following cycles. On the contrary, for the samples with covalently functionalized nanotubes with the sulfur-containing molecule, excellent stability is observed, with 95% of the initial capacity maintained after 50 cycles.

«Post-mortem» tests were also conducted with the three aforementioned button batteries, consisting of dissociating them in order to analyze the color of the electrolyte.

For the battery with grafted nanotubes and the battery with non-grafted nanotubes, no coloration of the electrolyte is observed.

For the battery with a mixture (non-grafted nanotubes+sulfur-containing molecules), the electrolyte assumed a brown-green coloration, a sign of the dissolution of the sulfur-containing molecule in the solvent.

These tests confirm that there is no dissolution of the active material in the case of covalent grafting of the sulfur-containing molecule to the carbon nanotubes.

The proposed new cathode material therefore actually preserves the system from the loss of capacity during cycling by immobilizing the active material at the positive electrode.

The invention claimed is:

1. A lithium accumulator comprising at least one electrochemical cell comprising an electrolyte positioned between a positive electrode and a negative electrode, said positive electrode comprising a positive electrode material comprising a carbonaceous material selected from carbon nanotubes, graphene, and derivatives of graphene comprising graphene oxides, or reduced graphene oxides, wherein said carbonaceous material is covalently functionalized by at least one organic compound comprising at least one electron attractor group.

2. The lithium accumulator according to claim 1, wherein the organic compound comprising at least one electron attractor group is a compound comprising one or several cyclic groups, for which at least one of these groups bears at least one electron attractor group.

3. The lithium accumulator according to claim 1, wherein the electron attractor group is selected from carbonyl groups, disulfide groups, and thiocarbonyl groups.

4. The lithium accumulator according to claim 1, wherein, when the electron attractor group is a carbonyl group, the electron attractor group is conjugate with a double bond.

5. The lithium accumulator according to claim 1, wherein, when the electron attractor group is a carbonyl group, the organic compound comprising such an electron attractor group is a quinone compound.

6. The lithium accumulator according to claim 1, wherein, when the electron attractor group is a carbonyl group, the organic compound comprising such an electron attractor group is selected from:

benzoquinone compounds of the following formulae (I) and (II):

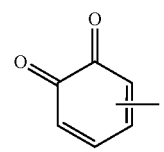

(I)

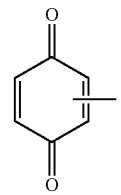

(II)

a naphthoquinone compound of the following formula (III):

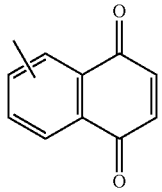
(III)

an anthraquinone compound of the following formula (IV):

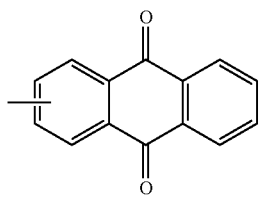
(IV)

a phenanthrenequinone compound of the following formula (V):

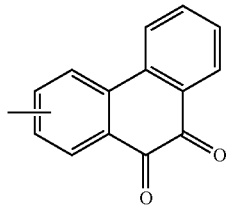
(V)

wherein the bonds located at the middle of the carbon-carbon bonds indicate that the attachment to the carbonaceous material of the relevant compound is ensured by any of the carbon atoms making up the benzene ring(s).

7. The lithium accumulator according to claim 6, wherein the organic compound comprising at least one electron attractor group is a compound of the following formula (VI):

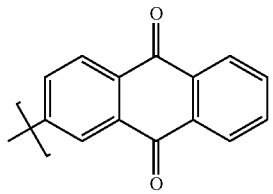
(VI)

the bond intercepted with a bracket indicating that the attachment of the relevant compound by covalence to the carbonaceous material is carried out via this bond.

8. The lithium accumulator according to claim 1, wherein, when the electron attractor group is a carbonyl group, the compound comprising such electron attractor group is a polymer comprising at least one recurrent unit, said recurrent unit comprises one or several rings, for which one of these rings is a ring comprising at least one carbonyl group.

9. The lithium accumulator according to claim 8, wherein the compound comprises at least one recurrent unit from the family of quinones.

10. The lithium accumulator according to claim 1, wherein, when the electron attractor group is a disulfide group, the compound comprising the electron attractor group is a cyclic compound including one or several rings, wherein at least one ring includes a disulfide group.

11. The lithium accumulator according to claim 10, wherein the compound is a cyclic compound including one or several rings, wherein at least one ring includes a disulfide group and includes 4 atoms and two of these atoms are sulfur atoms.

12. The lithium accumulator according to claim 1, wherein, when the electron attractor group is a disulfide group, the compound comprising the electron attractor group is a cyclic compound comprising at least one aromatic ring beside at least one ring comprising a disulfide group.

13. The lithium accumulator according to claim 1, wherein, when the electron attractor group is a disulfide group, the compound comprising the electron attractor group is a compound fitting one of the following formulae (VII) to (X):

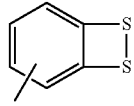
(VII)

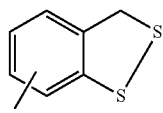
(VIII)

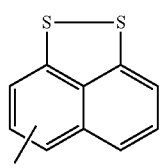
(IX)

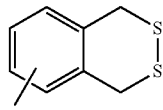
(X)

the bond intercepting the carbon-carbon bond indicating that the bond between the benzene ring(s) and the carbonaceous material is ensured through one of the carbon atoms of this or these ring(s).

14. The lithium accumulator according to claim 1, wherein, when the electron attractor group is a disulfide group, the compound comprising the electron attractor group is a polymer comprising at least one recurrent unit, which recurrent unit comprises one or several rings, for which one of these rings is a ring comprising a disulfide group.

15. The lithium accumulator according to claim 14, wherein the compound comprises at least one recurrent unit fitting one of the following formulae (XI) to (XV):

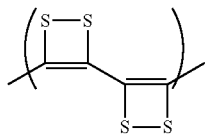
(XI)

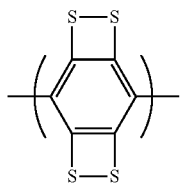
(XII)

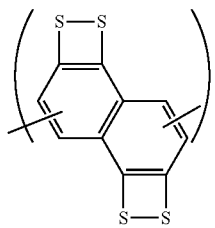
(XIII)

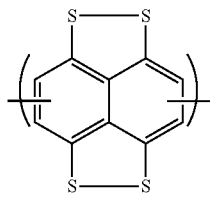
(XIV)

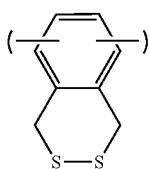
(XV)

wherein said recurrent units may be bound to the carbonaceous material via an organic group forming a bridge between the relevant recurrent unit and the carbonaceous material.

16. A positive electrode material for a lithium accumulator comprising a carbonaceous material selected from carbon nanotubes, graphene, and derivatives of graphene comprising graphene oxides, or reduced graphene oxides, wherein said carbonaceous material is covalently functionalized by at least one organic compound comprising at least one electron attractor group, which is a disulfide group.

17. The positive electrode material according to claim 16, wherein the compound comprising a disulfide group is a cyclic compound including one or several rings, wherein at least one ring includes a disulfide group.

18. The positive electrode material according to claim 16, wherein the compound comprising a disulfide group is a cyclic compound including one or several rings, wherein at least one ring includes a disulfide group and includes 4 atoms and-two of these atoms are sulfur atoms.

19. The positive electrode material according to claim 16, wherein the compound comprising a disulfide group is a cyclic compound comprising at least one aromatic ring beside at least one ring comprising a disulfide group.

20. The positive electrode material according to claim 16, wherein the compound comprising a disulfide group is a compound fitting one of the following formulae (VII) to (X):

(VII)

(VIII)

(IX)

(X)

wherein the bond intercepting the carbon-carbon bond indicates that the bond between the benzene ring(s) and the carbonaceous material is ensured by one of the carbon atoms of this or these ring(s).

21. The positive electrode material according to claim 16, wherein the compound comprising a disulfide group is a polymer comprising at least one recurrent unit, and said recurrent unit comprises one or several rings, for which one of these rings is a ring comprising a disulfide group.

22. The positive electrode material according to claim 21, wherein the compound comprises at least one recurrent unit fitting one of the following formulae (XI) to (XV):

(XI)

(XII)

(XIII)

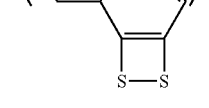

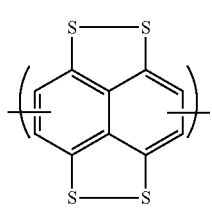
(XIV)
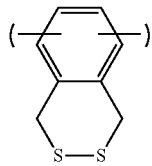
(XV)
wherein said recurrent units may be bound to the carbonaceous material via an organic group forming a bridge between the relevant recurrent unit and the carbonaceous material.
23. A positive electrode comprising a positive electrode material comprising a material as defined according to claim 16.
* * * * *